(12) United States Patent
Cox et al.

(10) Patent No.: US 6,856,983 B2
(45) Date of Patent: Feb. 15, 2005

(54) ADAPTIVE FEEDBACK CONTROL IN E-SERVICE MANAGEMENT

(75) Inventors: Earl D. Cox, Morrisville, NC (US); Xindong Wang, Columbia, MD (US); Shi-Yue Qiu, Ellicott City, MD (US)

(73) Assignee: Panacya, Inc., Columbia, MD (US)

( * ) Notice: Subject to any disclaimer, the term of this patent is extended or adjusted under 35 U.S.C. 154(b) by 650 days.

(21) Appl. No.: 10/032,966

(22) Filed: Oct. 26, 2001

(65) Prior Publication Data

US 2002/0128991 A1 Sep. 12, 2002

Related U.S. Application Data

(60) Provisional application No. 60/243,470, filed on Oct. 27, 2000.

(51) Int. Cl.$^7$ ............................................... G06F 9/44
(52) U.S. Cl. .............................. 706/52; 706/31; 706/14
(58) Field of Search .............................. 706/52, 31, 14

(56) References Cited

U.S. PATENT DOCUMENTS

| | | | | |
|---|---|---|---|---|
| 5,754,939 A | * | 5/1998 | Herz et al. | 455/3.04 |
| 5,835,087 A | * | 11/1998 | Herz et al. | 345/810 |
| 5,867,494 A | * | 2/1999 | Krishnaswamy et al. | 370/352 |
| 5,867,495 A | * | 2/1999 | Elliott et al. | 370/352 |
| 5,999,525 A | * | 12/1999 | Krishnaswamy et al. | 370/352 |
| 6,029,195 A | * | 2/2000 | Herz | 725/116 |
| 6,335,927 B1 | * | 1/2002 | Elliott et al. | 370/352 |
| 6,411,936 B1 | * | 6/2002 | Sanders | 705/10 |
| 6,460,036 B1 | * | 10/2002 | Herz | 707/10 |
| 6,581,049 B1 | * | 6/2003 | Aparicio et al. | 706/39 |
| 6,711,585 B1 | * | 3/2004 | Copperman et al. | 707/104.1 |
| 6,754,181 B1 | * | 6/2004 | Elliott et al. | 370/252 |
| 6,778,863 B1 | * | 8/2004 | Lienhard et al. | 700/32 |

OTHER PUBLICATIONS

Hollywood: a business model for the future? Charles E. Grantham, Special Interest Group on Computer Personnel Research Annual Conference, Proceedings of the 2000 ACM SIGCPR conference on Computer personnel research, pp.: 8–15.*

Behavioral control for real–time simulated human agents, John P. Granieri et alo., Symposium on Interactive 3D Graphics, Proceedings of the 1995 symposium on Interactive 3D graphics, ACM Special Interest Group on Computer Graphics Interactive Techniques.*

Placement feedback: a concept and method for better min–cut placements, Andrew B. Kahng et al., Annual ACM IEEE Design Automation Conference, Proceedings of the 41st annual conference on Design automation (2004) ACM Special Interest Group Design Automata.*

A theoretical analysis of feedback flow control, S. Shenker, Applications, Technologies, Architectures,and Protocols for Computer Communication, Proceedings of the ACM symposium on Communications architectures & protocols (1990) ACM Special Interest.*

* cited by examiner

*Primary Examiner*—Anthony Knight
*Assistant Examiner*—Michael B. Holmes
(74) *Attorney, Agent, or Firm*—McKenna Long & Aldridge LLP (57) ABSTRACT

A method and system is described that adaptively adjusts an eService management system by using feedback control. Behavior experts are distributed at different levels of the hierarchy of the eService management system. Within the hierarchy, feed-forward reasoning is performed from lower level behavior experts to the higher level behavior experts. A method for identifying bottlenecks is described and utilized. The performance of these behavior experts is compared with various objective functions. The discrepancies are used to adjust the system.

20 Claims, 8 Drawing Sheets

ADAPTIVE FEEDBACK CONTROL IN E-SERVICE MANAGEMENT

APPLICATION DATA

Five utility patent applications are being filed simultaneously that relate to various aspects of eService management. The five provisional applications are entitled "The eService Business Model", "Framework for eService Management", "Behavior Experts in eService Management", "The Uniform Data Model", and "Adaptive Feedback Control". The subject matter of each is hereby incorporated by reference into each of the others.

The instant utility patent application claims the benefit of the filing date of Oct. 27, 2000 of earlier pending provisional application 60/243,470 under 35 U.S.C. 119(e).

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

1. Field of the Invention

Aspects of the present invention relate to the field of e-commerce. Other aspects of the present invention relate to a method and system to intelligently manage an infrastructure that supports an e-service business.

2. General Background and Related Art

The expanding use of the World-Wide Web (WWW) for business continues to accelerate and virtual corporations are becoming more commonplace. Many new businesses, born in this Internet Age, do not employ traditional concepts of physical site location (bricks and mortar), on-hand inventories and direct customer contact. Many traditional businesses, who want to survive the Internet revolution are rapidly reorganizing (or re-inventing) themselves into web-centric enterprises. In today's high-speed Business-to-Business (B2B) and Business-to-Customer (B2C) eBusiness environment, a corporation must provide high quality service, scale to accommodate exploding demand and be flexible enough to rapidly respond to market changes.

The growth of eBusiness is being driven by fundamental economic changes. Firms that harness the Internet as the backbone of their business are enjoying tremendous market share gains—mostly at the expense of the unenlightened that remain true to yesterday's business models. Whether it is rapid expansion into new markets, driving down cost structures, or beating competitors to market, there are fundamental advantages to eBusiness that cannot be replicated in the "brick and mortar" world.

This fundamental economic shift, driven by the tremendous opportunity to capture new markets and expand existing market share, is not without great risks. If a customer cannot buy goods and services quickly, cleanly, and confidently from one supplier, a simple search will divulge a host of other companies providing the same goods and services. Competition is always a click away.

eBusinesses are rapidly stretching their enterprises across the globe, connecting new products to new marketplaces and new ways of doing business. These emerging eMarketplaces fuse suppliers, partners and consumers as well as infrastructure and application outsourcers into a powerful but often intangible Virtual Enterprise. The infrastructure supporting the new breed of virtual corporations has become exponentially more complex—and, in ways unforeseen just a short while ago, unmanageable by even the most advanced of today's tools. The dynamic and shifting nature of complex business relationships and dependencies is not only particularly difficult to understand (and, hence manage) but even a partial outage among just a handful of dependencies can be catastrophic to an eBusiness' survival.

Businesses are racing to deploy Internet enabled services in order to gain competitive advantage and realize the many benefits of eBusiness. For an eBusiness, time-to-value is so critical that often these business services are brought on-line without the ability to manage or sustain the service. eBusinesses have been ravaged with catastrophe after catastrophe. Adequate technology, to effectively prevent these catastrophes, does not exist.

eBusiness infrastructures operate around the clock, around the globe, and constantly evolving. If a critical supplier in Asia cannot process an electronic order due to infrastructure problems, the entire supply chain may come to a grinding halt. Who understands the relationships between technology and business processes and between producer and supplier? Are they available 24 hours a day, 7 days a week, 365 a year? How long will it take to find the right person and rectify the problem? The promise of B2B, B2C and eCommerce in general will not be fully realized until technology is viewed in light of business process to solve these problems.

Web-enabled eBusiness processes effectively distill all computing resources down to a single customer-visible service (or eService). For example, a user interacts with a web site to make an on-line purchase. All of the back-end hardware and software components supporting this service are hidden, so the user's perception of the entire organization is based on this single point of interaction. How can organizations mitigate these risks and gain the benefits of well-managed eServices?

Never before has an organization been so dependent on a single point of service delivery—the eService. An organization's reputation and brand depend on the quality of eService delivery because, to the outside world, the eService is the organization. If service delivery is unreliable, the organization is perceived as unreliable. If the eService is slow or unresponsive, the company is perceived as being slow or unresponsive. If the Service is down, the organization might as well be out of business.

Further complicating matters, more and more corporations are outsourcing all or part of their web-based business portals. While reducing capital and personnel costs and increasing scalability and flexibility, this makes Application Service Providers (ASPs), Internet Service Providers (ISPs) and Managed Service Providers (MSPs) the custodians of a corporation's business. These "xSPs" face similar challenges—delivering quality service in a rapid, cost efficient manner with the added complication of doing so across a broad array of clients. Their ability to meet Service Level Agreements (SLAs) is crucial to the eBusiness developing a respected, high quality electronic brand—the equivalent of prime storefront property in a traditional brick and mortar business.

The Internet enables companies to outsource those areas in which the company does not specialize. This collaboration strategy creates a loss of control over infrastructure and business processes between companies comprising the complete value chain. Partners, including suppliers and service providers must work in concert to provide a high quality service. But how does a company control infrastructure which it doesn't own and processes that transcend its' organizational boundaries? Even infrastructure outsourcers don't have mature tools or the capability to manage across organizational boundaries.

The underlying problem is not lack of resources, but the misguided attempt to apply yesterday's management technology to today's eService problem. As noted by Forrester Research, "Most companies use 'systems' management tools to solve pressing operational problems. None of these tools can directly map a system or service failure to business impact." To compensate, they rely on slow, manual deployment by expensive and hard-to-find technical personnel to diagnose the impact of infrastructure failures on service delivery (or, conversely, to explain service failures in terms of events in the underlying infrastructure). The result is very long time-to-value and an unresponsive support infrastructure. In an extremely competitive marketplace, the resulting service degradation and excessive costs can be fatal.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

An embodiment of the invention is illustrated that is related to the adaptive feedback control capability of an eService management system. The present invention enables adaptive eService management by learning the impact of an infrastructure on the eService that it supports and then by using the learned experience to adjust the Behavior eXperts (BeXs) at different levels of the corresponding eService management system. Both the learning and adjusting are in accordance with the eService business process and the dynamic operational status of the eService environment. With such learning and self-adjusting behavior of an eService management system, the distributed BeXs evolve towards an optimal state of the eService management to ensure the quality of the eService. The eService business model dictates the learning and the feedback control.

Figure 1:
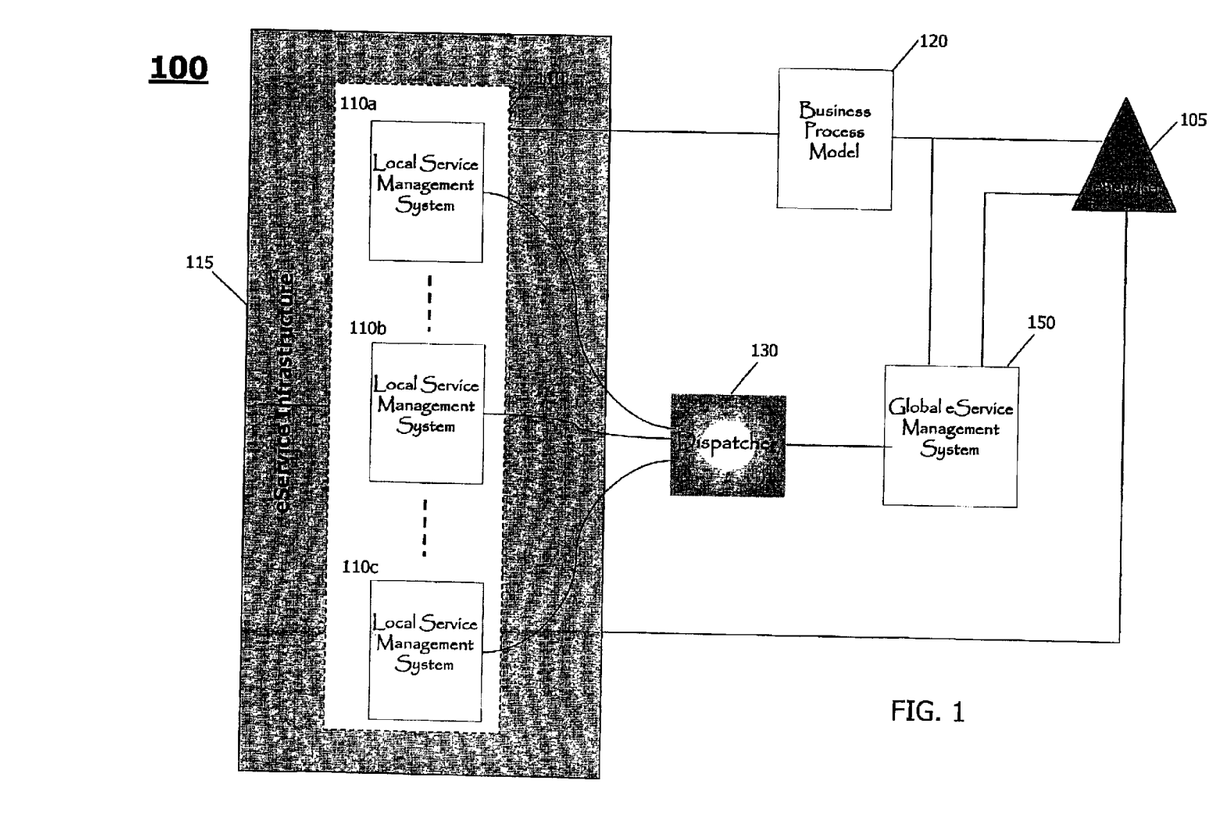
FIG. 1 shows a high level block diagram of an eService management system.

FIG. 1 is a high level diagram of an eService Management System 100. eService 105 is a web-centric service which allows electronic transactions over the Internet. Such web-centric service may, for example sell books, shoes, or flowers. It may also sell stocks or information. eService 105 is supported by eService infrastructure 115 which may comprise infrastructure components such as web servers, databases, billing systems, or other eServices. In infrastructure 115, each component plays a distinct role. For example, for a shoes.com eService that sells shoes, a database may be part of the infrastructure that stores all the transaction information. The performance of each infrastructure component may affect the overall quality of service of shoes.com eService.

In FIG. 1, there is a cluster, 110, of local management systems. Each of the local service management systems may be responsible for the management of an infrastructure component in 115. For example, local service management system 110b may be used to monitor the performance of a database for shoes.com. The performance information about the components of an eService infrastructure may be sent through dispatcher 130 and stored in the global data repository from where a global eService management system 150 may integrate the information from local service management systems 110 to assess the overall performance of the eService. In FIG. 1, dispatcher 130 may represent a collective that may comprises one or more dispatchers.

The quality of an eService depends on various factors. Such factors are related to both the performance of individual infrastructure components and how the business process of the eService takes place within the infrastructure. Different components may impact the quality of eService differently, depending on the role of the component with respect to the business process. Therefore, the strategy to manage the infrastructure that supports an eService is directly related to or dictated by the business process model of the eService. In FIG. 1, business process model 120 is derived from eService 105. It dictates both how the infrastructure components should be managed by local service management systems 110 and how global eService management system integrates the information from systems 110 to assess the overall performance of infrastructure 115. The knowledge about business process model 120 may be distributed in local service management systems 110a, 110b, . . . , 110c.

There may be multiple global eService management systems. Different global eService management systems may be responsible for different eServices but they may share local service management systems. Therefore, while global eService management system 150 may seem to be a centralized unit in system 100, it may also be distributed, similar to local service management systems.

Figure 2:
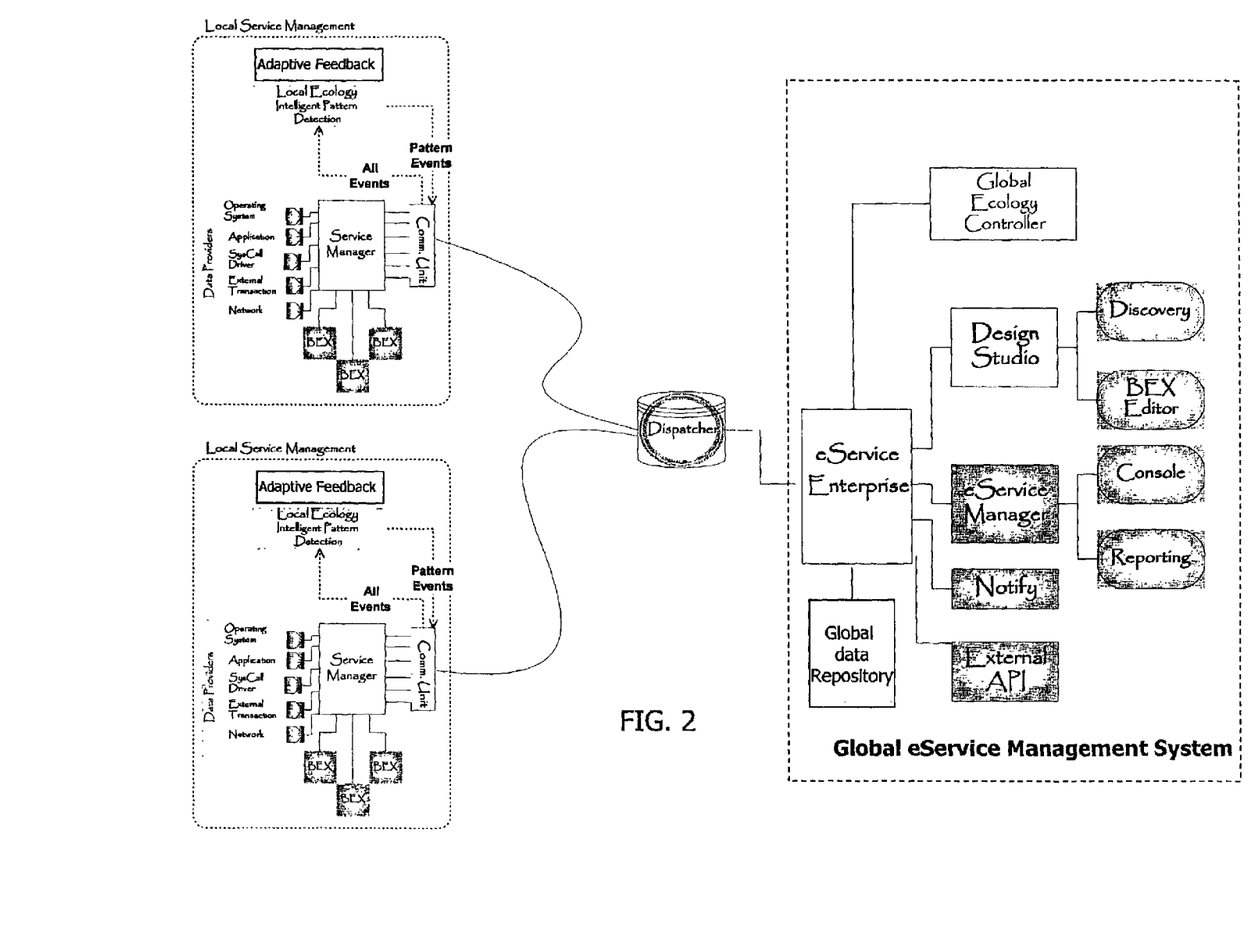
FIG. 2 presents a detailed view of an eService management system with adaptive feedback mechanism shown.

FIG. 2 describes in more detail the internal structure of both local service management systems and global eService management systems. Each local service management system comprises a plurality of data providers, a service manager, a plurality of Behavior eXperts (BeXs), a local ecology pattern detector, an adaptive feedback mechanism, and a communication unit.

Data providers supply the observations about the operational status of various infrastructure components to the service manager. The service manager converts the observation data to Generic Data Objects so that different behavior experts (BeXs) may access the observation data in a uniform way.

Each BeX in a local service management system may be attached to an infrastructure component and is designed to monitor the behavior of the component. A BeX may access the observation data from the data providers and analyze the behavior of an infrastructure component based on such data. Each BeX reports any detected abnormal behavior of individual components, in the form of events, to a blackboard server located in the service manager so that its findings may be shared among different BeXs. The Service manager routes events from various BeXs to a local ecology pattern detector where all the events are considered as a whole in order to detect abnormal behavior of the local system. Detected ecological pattern events may be reported, together with some of the individual events that have high priorities, to dispatcher 130.

Each local service management acts asynchronously to ensure the performance of a local infrastructure. Internal to each local management system, adaptive feedback may also be activated so that the behavior of each local system may be adjusted to be consistent with the desired behavior. For example, if a BeX in a local service management system always reports a certain type of abnormal event and it always turned out to be a false alarm (e.g., the reported event does not have significant ecological impact on the local system), the local service system may trigger an adaptive feedback control to adjust the BeX so that it becomes less sensitive to these events and consequently, more sensitive to events that actually do not impact the eService. Details about local service management systems are discussed in provisional patent application entitled "Framework of eService Management", filed simultaneously with the present invention.

The performance information gathered from different local service management systems and routed through the dispatcher and stored in global data repository 770 is accessed by global eService management system 150. It comprises a global ecology controller, an eService manager, a design studio, a notifier, and a port for external APIs.

The global ecology controller integrates the information from all local service management systems and detects global abnormal events. It also measures the impact of detected abnormal behavior in different parts of the infrastructure on the eService. The translation from local infrastructure performance data to an overall eService quality estimation is performed based on the business process model of the underlying eService. The global ecology controller may also activate adaptive feedback control. It may send feedback adjustments to different local service management systems, from where the adjustments may be passed further down to various individual BeXs. The purpose of adaptive feedback control is to adjust the behavior of an eService management system so that it works at an optimal state to ensure the quality of an eService.

In FIG. 2, both the local ecology pattern detectors as well as the global ecology controller may be implemented using BeXs. Essentially, a BeX is an intelligent reasoning mechanism that takes input data and generates output based on its expert knowledge. The distinction between an individual BeX and the BeX for, for example, local ecology pattern detector, is merely functional rather than structural and methodological. A BeX that is attached to an infrastructure component may perform an individual monitoring task. A BeX implemented at an ecological level may perform higher level integration task.

Figure 3:
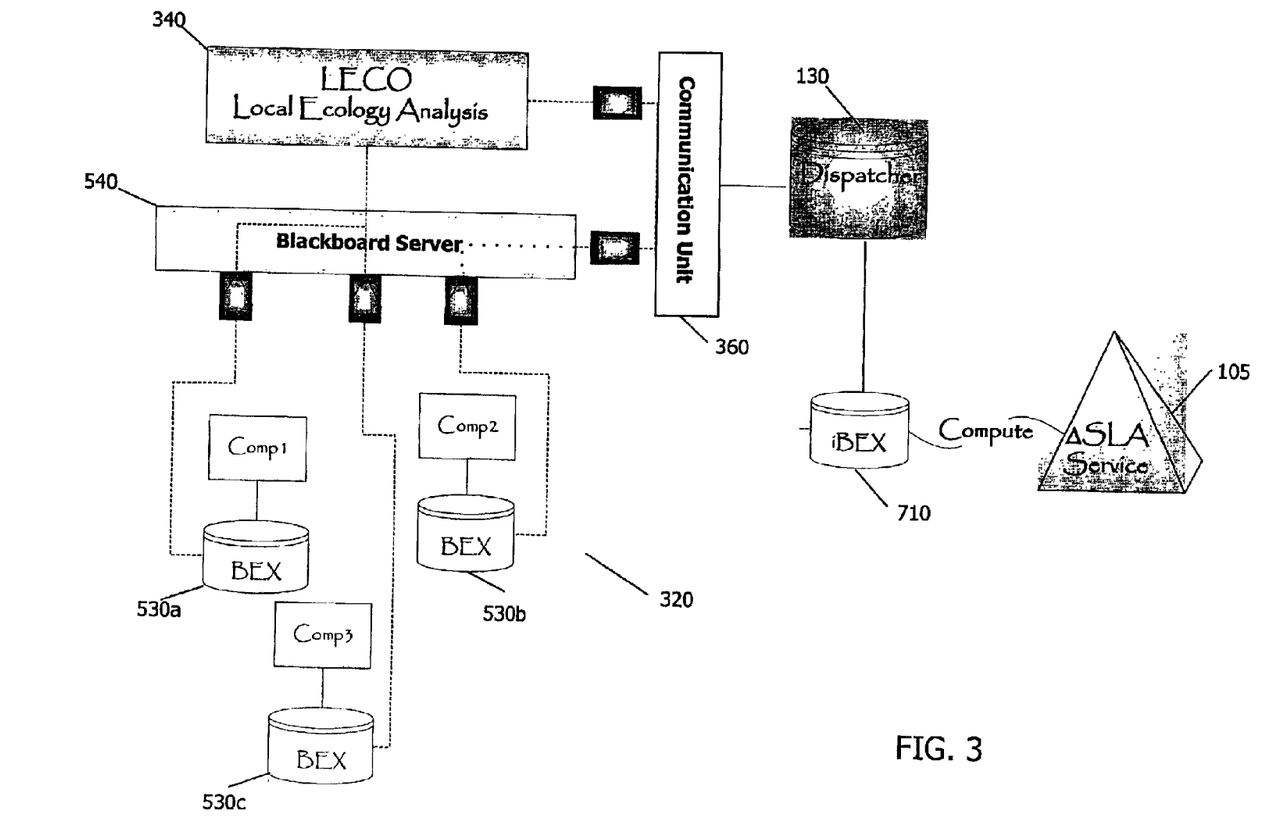
FIG. 3 illustrates how behavior experts at different levels of an eService management system interact with each other.

FIG. 3 shows how BeXs at different levels interact with each other. BeXs 530a, 530b, and 530c are individual BeXs that are attached to different infrastructure components. These individual BeXs post their events on a blackboard server from where an integration BeX for detecting ecological patterns access the abnormal events for integration purposes. Some of the abnormal events detected by individual BeXs may be routed directly to dispatcher 130. Together with the abnormal local ecological events, data in the global data repository is accessed by another integration BeX (iBeX) that implements the global ecology controller.

Although individual BeXs and integration BeXs are different in terms of the role they play and the knowledge they possess, they all have the same structure.

Figure 4:
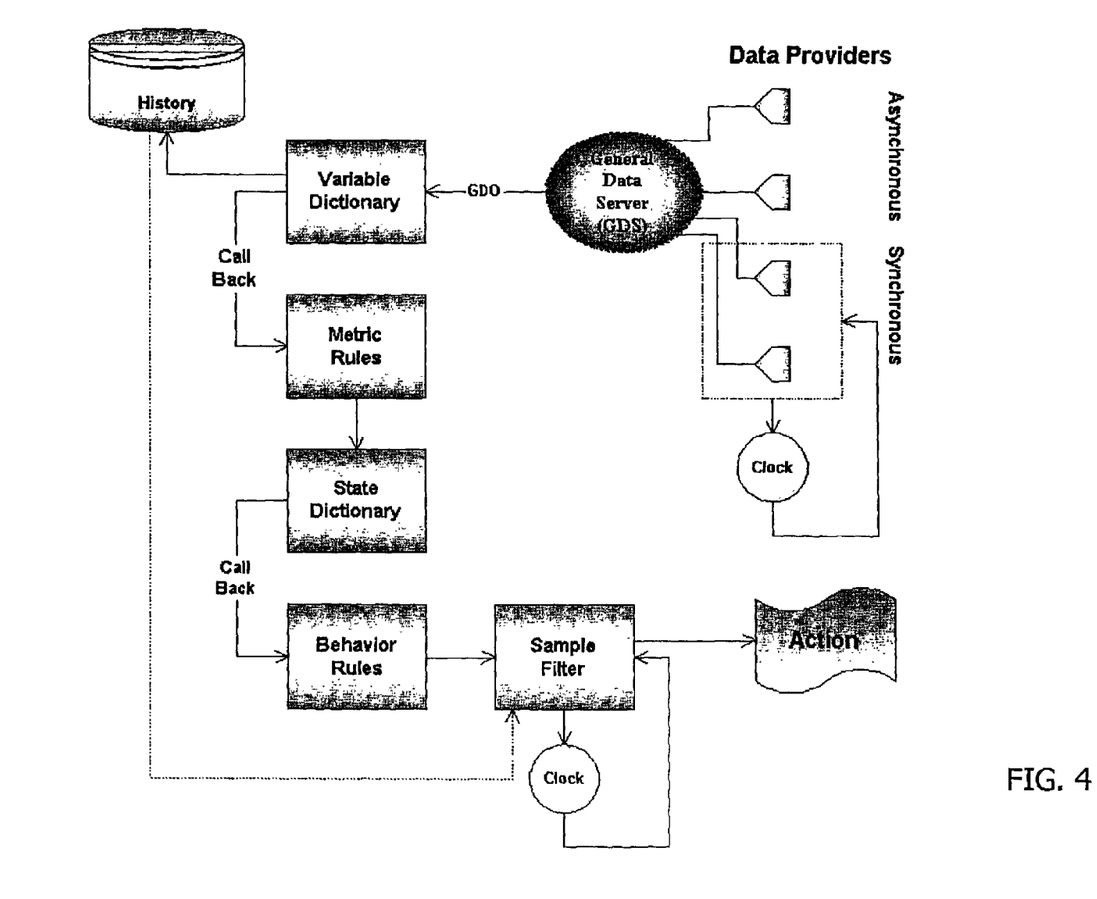
FIG. 4 shows the internal structure of a behavior expert.

FIG. 4 shows the internal structure of a BeX. A BeX has a set of variables, a set of states, a set of metric rules, and a set of behavior rules. Taking input from a general data server (GDS), that converts observation data from a set of data providers into generic data objects (GDOs), a BeX populates its variables. Metric rules act on the values of the variables and are fired when the conditions of the rules are met. The fired metric rules update the values of the states which may further trigger the firing of a set of behavior rules.

Behavior rules are designed to detect any abnormal behavior of a monitored infrastructure component. When the conditions of a behavior rule are satisfied, the rule may trigger the action to generate events that signal abnormal behavior of the underlying component. The history of firings of rules (including metric rules and behavior rules) may be stored in a storage. The acts of each BeX may be clocked for synchronization.

Figure 5:
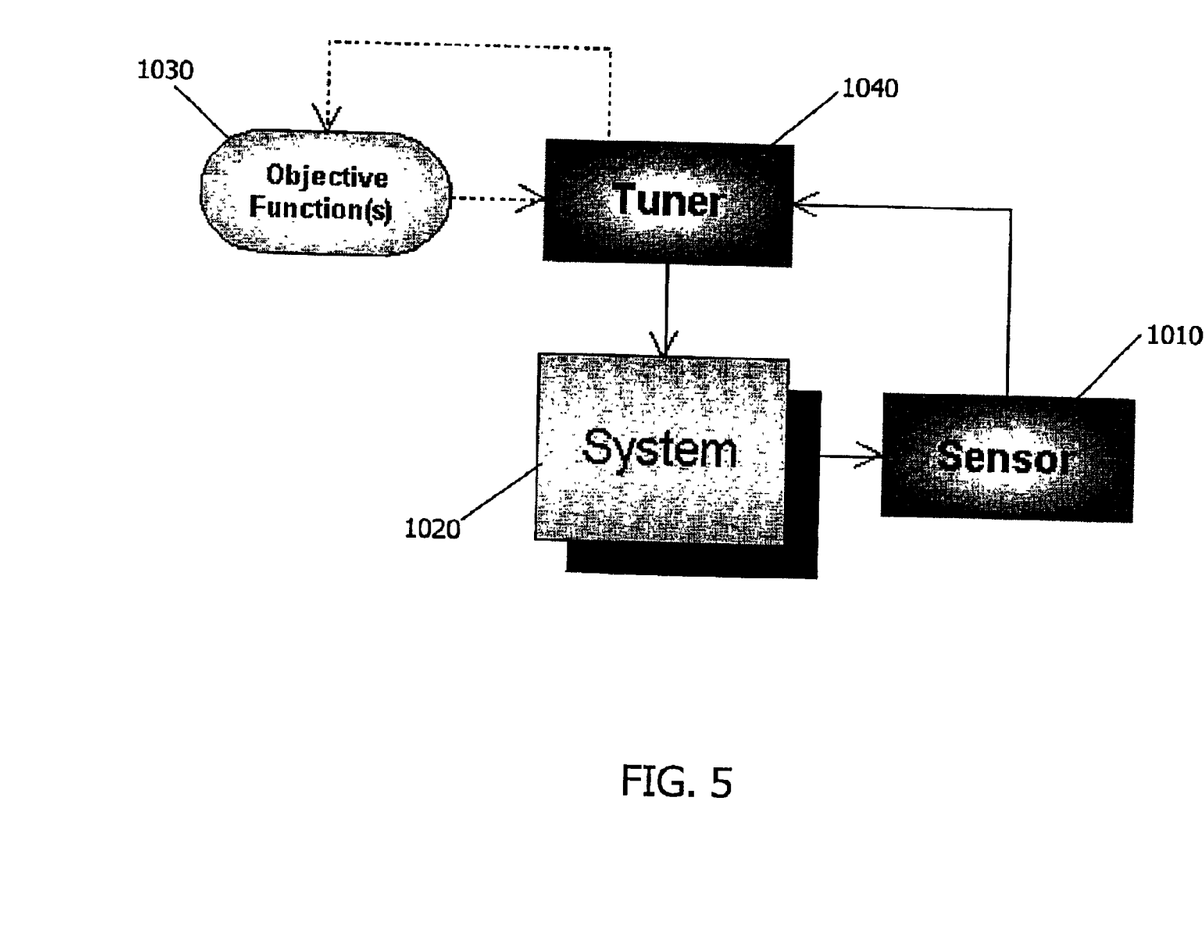
FIG. 5 illustrates a high level block diagram of an embodiment of the present invention in which an adaptive feedback control mechanism is shown.

A BeX may be used for other special functions. For example, a specially coded BeXs called Adaptive-Support Behavior eXpert (or ABeX) may be used for adaptive feedback control. Adaptive feedback control may be a top down process. FIG. 5 shows a general block diagram of adaptive feedback. System 1020 represents a collection of BeXs. A sensor array 1010 may observe and record how system 1020 reacts to different situations in service management. Such sensor data is sent to a tuner 1040. Tuner 1040 is equipped with a set of objective functions that are related to expected system performance. If the recorded data about system 1020 does not match with the objective functions, tuner 1040 initiates adaptive feedback control to tune system 1020. The tuning may be achieved by forcing the BeXs in system 1020 to revise the rules that are related to unsatisfactory performance.

In a system that is capable of adaptive control, assume there are a set of irreducible ingredients. Among them, N ingredients are tunable and M ingredients are un-tunable. Denote the set of tunable ingredients by $\{x_1, x_2, \ldots, x_N\}$ and the set of un-tunable ingredients by $\{P_1, P_2, \ldots P_M\}$. The figure of merit (FOM) for the system is then a function of these irreducible ingredients. The FOM may be intrinsically a fuzzy concept and may be considered as a subjective concept. However, there may be objective ways to measure FOM, or to measure the degree of "something" in fuzzy set language.

Assume FOM depends only on $\{x_1, x_2, \ldots, x_N\}$ and $\{P_1, P_2, \ldots P_M\}$ and denote an approximation function of FOM by $f[x_1, x_2, \ldots, x_N; P_1, P_2, \ldots, P_M]$. The goal is to make the approximation function $f[x_1, x_2, \ldots, X_N; P_1, P_2, \ldots, P_M]$ as close to the FOM as possible. There may be certain procedures to try to decipher the f function by, for example, training a neural net (defined by a set of parameters $\{\theta\}$) to obtain an approximation:

$$f_{\{\theta\}}[x_1, x_2, \ldots, x_N; P_1, P_2, \ldots, P_M].$$

With such an approximation, the adaptive feedback then becomes an optimization problem: Given $\{P_1, P_2, \ldots, P_M\}$, tune $\{x_1, x_2, \ldots, X_N\}$ so that function $f_{\{\theta\}}[x_1, x_2, \ldots, X_N; P_1, P_2, \ldots, P_M]$ is maximized.

This optimization problem is not static or does not have a closed form solution. That is, we are not dealing with one single problem where $\{P_1, P_2, \ldots P_M\}$ are fixed and all known to us. We are dealing with a dynamic or open system where $\{P_1, P_2, \ldots P_M\}$ are not only changing with time but also, at least some of them, are hidden.

An open system may be characterized by several properties. First, the changes of parameters may not be within our control. Second, some of the parameters may not be explicitly considered or defined in the optimization scheme. This "invisibility" implies that we may no longer be able to truly optimize the system since we never know whether the final solution is the optimal solution. The best solution may keep the system stable within an acceptable range of their FOM by adjusting tunable parameters. Associated with this non-deterministic property, some of the p's have to be treated as stochastic (or random) parameters so that they can be dealt with in a statistical sense.

Figure 6:
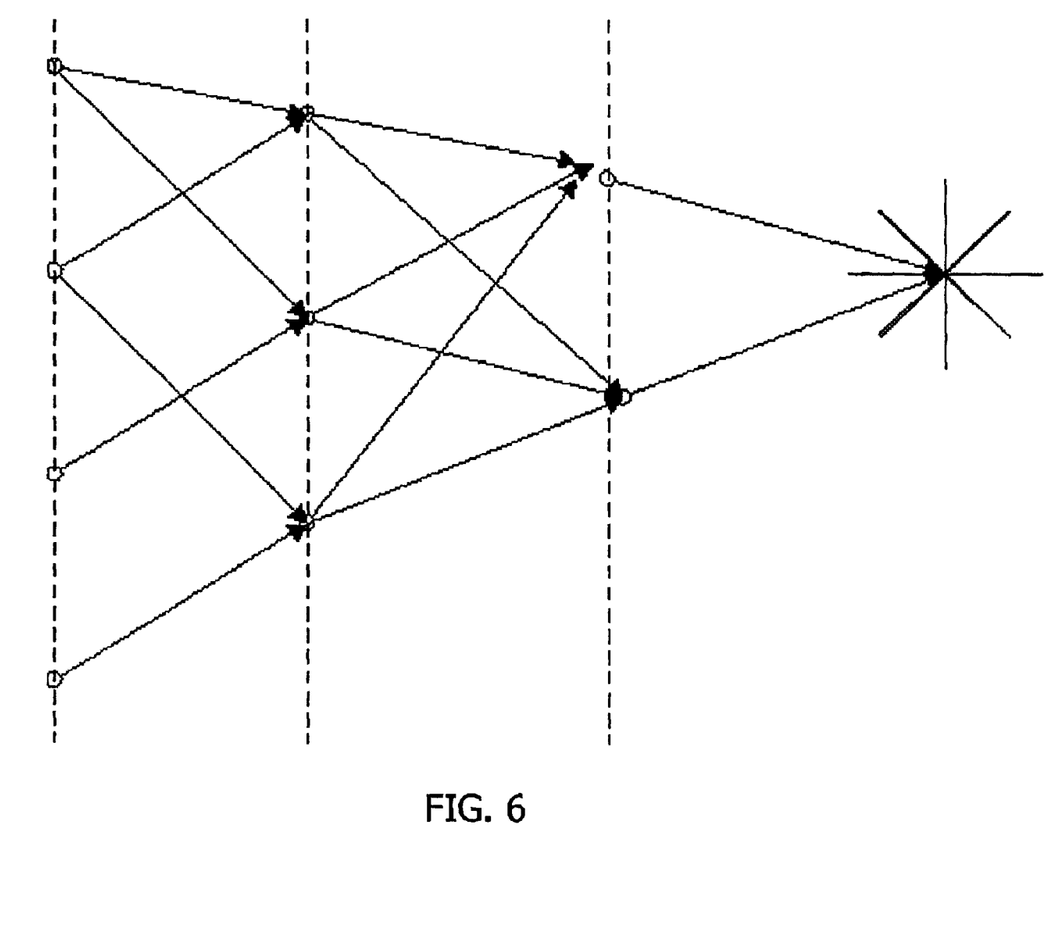
FIG. 6 shows an exemplary hierarchy in which behavior experts perform reasoning in forward direction and adaptive feedback control can be realized in a backward chain fashion.

To achieve a real time adaptive capability, an information aggregation mechanism is used. By doing so, a network of processes and their associated BeX's becomes a feed-forward hierarchical system as shown in FIG. 6. In FIG. 6, each arrow pointing into a node is a source of input and each arrow pointing out of a node is where the node sends its output. The dashed lines signify layers in a system. For each node, the number of inputs is usually much lower than the total number of ingredients N+M.

Operationally, information sampling/processing at different layers may have different sampling rates. The higher one moves up in the hierarchy, the smaller the sampling rates. A more desirable property is: the higher a layer is in the hierarchy, the fewer nodes there are within that layer. Based on the hierarchy shown in FIG. 6, information aggregation can be achieved by coarse graining in both time domain and logical units domain.

For each node i and each of its inputs (arrows), denote the output by $g_i^k[\{\overline{g_J^{K-1}}\}]$, where the overhead bar may represent the average along time. Each input of a node may be weighted and a node bias parameter may be implied during the evaluation of the output of the node. Using this general functional form, the output of a node may implement an arbitrary function, including a hidden neural net inside of the node. Given certain input, a node is capable of generating an output for the next layer. The output may be a scalar, a vector, or some more complicated object.

So far, the discussion has concentrated on the assessment part, i.e., given the situation, evaluate $f_{\{\theta\}}[x_1, x_2, \ldots, x_N; P_1, P_2, P_M]$ by a distributed network. In a hierarchy such as the one shown in FIG. 6, to keep the FOM at the top level within an acceptable range, the discrepancy between the approximation function $f_{\{\theta\}}[X_1, X_2, \ldots, X_N; P_1, P_2, \ldots, P_M]$ and the FOM needs to be back propagated down to the different nodes in the hierarchy so that adjustments may be made to reduce the discrepancy. This can be illustrated using a two-layer system with one master and several slaves. More complex networks may be dealt with by recursively applying the same procedure.

For simplicity, consider the case that each slave has only one master. In the case where a slave has more than one master, the masters will be assigned different authorities so that commands from a higher authority master will override the commands from lower authority masters when they disagree.

Since the number of inputs affecting the FOM of a current node is much smaller than the number of tunable parameters N, it is relatively a simple task if the master knows the tunabilty of its slaves. Particularly, in an eService management system, only the differential tunability or the incremental tunability needs to be defined.

Let $y = g(x_1, x_2, \ldots)$ be a multi-component function, the differential tunability of $x_i$ is simply $$1/(\partial y/\partial x_i).$$

The sign indicates the direction. For example, if y needs to be decreased by an incremental amount $\delta y$, the following procedure may be implemented:

Loop through $x_i$, i=1, 2, ..., M
Change $x_i$ by the amount $$(1/(\partial y/\partial x_i))dy/M,$$

If y is moving in the right direction, accept the change. (*)
End Loop.

In the above procedure, the line marked by (*) is necessary since the change in y caused by changing x may not be the same as what the model predicted. The accumulated discrepancies between the model prediction and the real response to the change may be used to refine the model in a similar fashion as to train a conventional neural network.

Related to the above absolute tunability, resistance may be defined as the ratio between the differential tunability and the remaining tunable range:

$$R_i = \frac{1/(\partial y/\partial x_i)}{(x_{extreme} - x_{current})},$$

where $x_{current}$ denotes the current value of x and $x_{extreme}$ denotes the allowed maximum(minimum) value of x, if $$(1/(\partial y/\partial x_i))dy$$

is positive(negative). When a high resistance parameter is identified, it may correspond to a bottleneck. If the bottleneck can not be resolved by tuning other parameters, a hardware change may then be required or the range of any acceptable FOM has to be adjusted.

Figure 7:
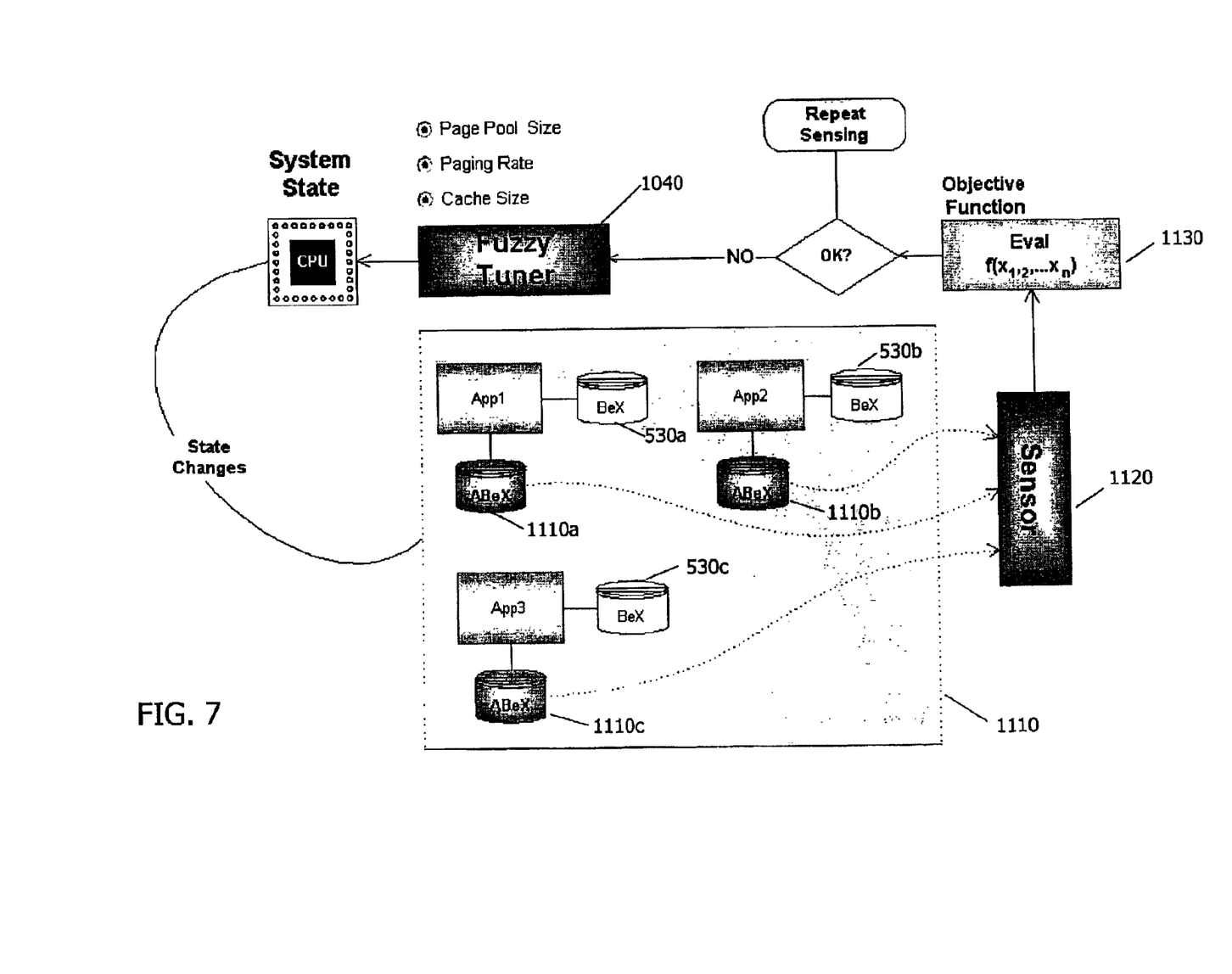
FIG. 7 shows how information flows in an adaptive feedback control process.

The adaptive control process may be seen in more detail in a block diagram shown in FIG. 7. System 1020 comprises, for example, three BeXs, 530a, 530b, and 530c, each of which is attached to an infrastructure component. In addition to these monitoring BeXs, a set of specially coded BeXs called adaptive-support BeXs or ABeXs, 1110a, 1110b, 1110c, are used for adaptive feedback control. Each of ABeXs comprises inter-connected external (shared) state variables that can be accessed by sensor 1010. Data from sensor 1010 is evaluated by an evaluator 1030 against a set of objective functions. The objective functions may be multiple dimensioned. The evaluation may be performed by computing a set of generalized distance of a high dimensional metric space between the sensed states and the target states (specified by the objective functions). The distance is used to determine the adjustment to be made. Tuner 1040 sends adjustments back to the associated BeXs to update their internal states.

The plant tuner is a fuzzy logic controller. The controller consists of fuzzy if-then rules (arranged in a connectionist architecture representing a state transition machine). Each ABeX contains a collection of fuzzy rules, which measure the performance of the system and report the degree of compatibility with the objective function (themselves organized as fuzzy numbers). Fuzzy rules employ variable window lad horizons so that changes in the system state can be accurately measured. Quantification of the objective function is achieved through several steps:

Centroid defuzzification of outcome space

Conversion of the defuzzified outcome to a fuzzy number with the appropriate expectancy interval Comparison with fuzzy objective using inverse of Euclidean distance as the similarity measurement control.

Run fuzzy rule base with each similarity coefficient to determine how to adjust machine parameters.

Nearly all the state variables in the ABeX systems are shared. These variables are identified by the leading underscore in their name (_CPUAlert). Sensor 1010, tuner 1040, and the evaluator 1040 may reside in a BeX where the adaptive feedback control is initiated.

Figure 8:
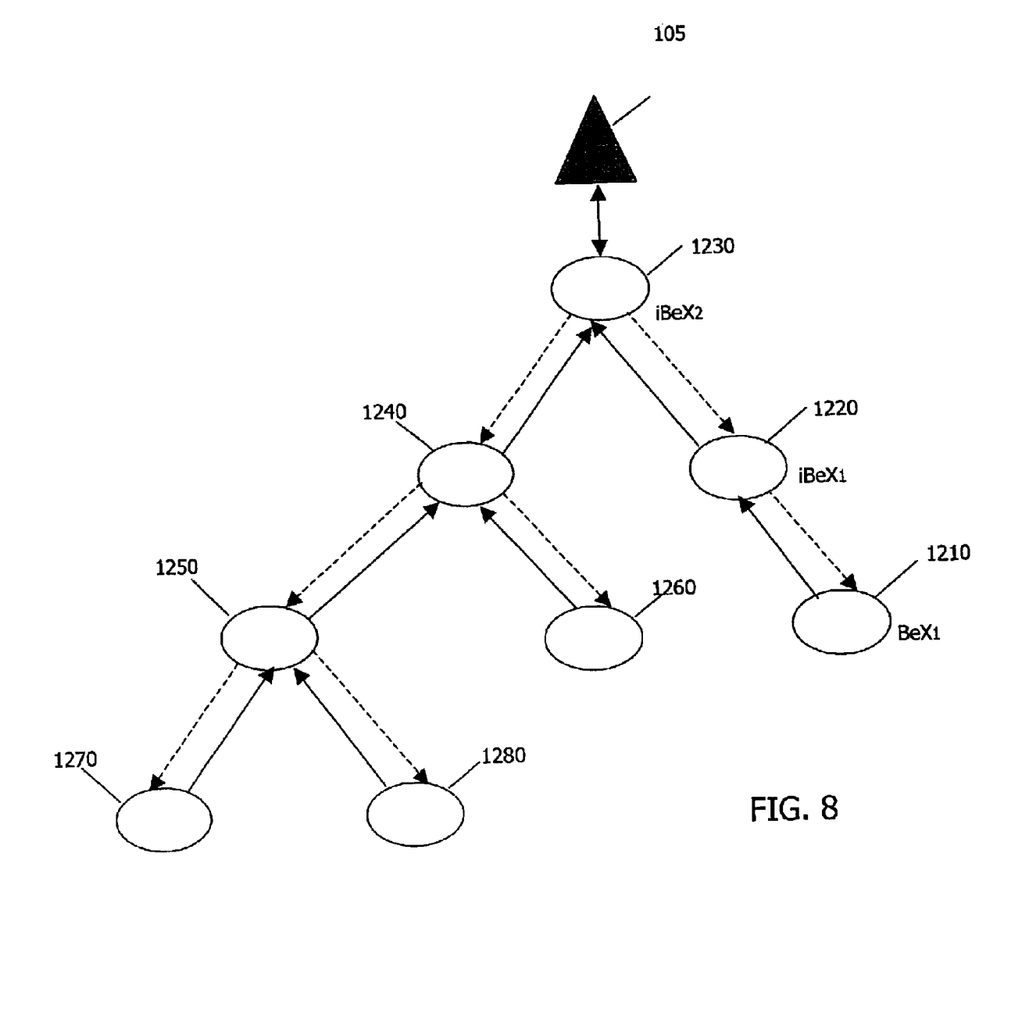
FIG. 8 gives an example of adaptive feedback control.

FIG. 8 shows an exemplary adaptive feedback control among a set of BeXs. BeX1 1210 is attached to an infrastructure component, for example, an application that computes the trend of a stock price. When the memory use of this particular application goes up to 35% on a local system, it may trigger a particular behavior rule. Since at component level, BeX1 has no knowledge about the higher level business need for the capacity of the memory of this local system, it has no way to know what kind of impact this abnormal behavior will cause on the overall eService performance. So, the behavior rule associated with this stock price application may conservatively trigger an action to simply report this abnormal behavior to a higher level BeX.

Based on the behavior rule of BeX1, this abnormal event is reported to an integration BeX 1220, located, for example, in local ecology pattern detector. The local integration BeX 1220 may still not have enough business process knowledge to estimate the severity of this particular abnormality with respect to the eService. So, it may further forward the event to a global integration BeX 1230, which may be located in a global ecology controller. Since BeX 1230 sits at the eService level, it is equipped with the knowledge about the business process of eService. Based on such knowledge and the reported events from all parts of the eService infrastructure (BeXs 1240, 1250, 1260, 1270, and 1280), it may estimate or detect a significant performance degradation at eService level. By analyzing the reported abnormal events, BeX 1230 may decide that the major factor responsible for the overall performance degradation is the lack of memory space at the system where the stock price application is running. It may further identify that lack of memory is due to the fact (according to the event reported from BeX1 1210) that a particular application has used up a large chuck of memory on that system and caused shortage of the memory. In addition, it may recognize that 1210 and 1220 are the BeXs that are responsible for that particular application.

The unexpected performance degradation and the identified cause may trigger BeX 1230 to decide that adaptive feedback control is necessary. Since it is clear at this point that BeX1, who is directly responsible for the faulty application, and all the BeXs that simply routed the information about the abnormal behavior of the faulty application fail to realize the severity of the misbehavior, iBeX 1230 initiates adaptive tuning by sending an updated rule to both BeX 1220 and BeX 1210. The rule is to be used to replace the conservative behavior rules that are previously used by both BeXs 1210 and 1220 regarding this particular behavior.

In the updated rule, it may explicitly indicate that if the memory usage of any single application exceeds 30%, then the application should be re-ranked with a much lower priority. It is also possible to simply instruct to kill such applications. The former strategy provides more space to conduct incremental learning. It is also possible for BeX 1230 to initiate a feedback control by sending a generic behavior rule to all the BeXs (1210, 1220, 1240, 1250, 1260, 1270, 1280) that restricts the use of any application at any time instance to maximum of 20% of total memory capacity.

Adaptive feedback control can be performed within different scopes. While the example shown in FIG. 8 is from the eService level all the way down to component level, it is also possible to initiate from local ecological level to component level or even among component level BeXs. It is flexible, dynamic, and learning based. It may be initiated when an unexpected performance degradation is due to the misjudgment from BeXs due to inexperience. It may be initiated because of other reasons. With the capability of self-adapting, the entire eSerive management system 100 is capable of continuous evolving, during its operation and based on accumulated experience, towards an optimal performance state.

We claim:

1. A method for adaptively adjusting an eService management system by using feedback control, comprising:

distributing behavior expert objects at different levels of a hierarchy of an eService management system;

performing, within the hierarchy, feed-forward reasoning from lower level behavior experts to higher level behavior experts;

comparing the performance of the behavior experts with various objective functions;

identifying bottlenecks by back-propagating the objective function; and using comparison discrepancies to adjust the system.

2. A system that adaptively adjusts an eService management system by using feedback control, comprising:

means for distributing behavior expert objects at different levels of a hierarchy of an eService management system;

means for performing, within the hierarchy, feed-forward reasoning from lower level behavior experts to higher level behavior experts;

means for comparing the performance of these behavior experts with various objective functions; means for identifying bottlenecks by back-propagating the objective function; and means for using comparison discrepancies to adjust the system.

3. A system for adaptively controlling an eService management system, comprising:

a plurality of behavior experts, hierarchically distributed throughout an infrastructure of the eService management system, wherein each behavior expert monitors and controls a particular aspect of an infrastructure according to an objective function; and a plurality of data providers which provide the behavior experts with observed data for a particular aspect of the infrastructure.

4. The system as claimed in claim 3, wherein each behavior expert comprises:

adjustable control parameters; and a set of one or more objective functions pertaining to the aspect of the infrastructure monitored and controlled by the behavior expert.

5. The system as claimed in claim 4, wherein each behavior expert in the hierarchical distribution is assigned a priority.

6. The system as claimed in claim 5, wherein the control parameters of a given behavior expert within the hierarchy are dynamically adjusted by a behavior expert assigned a higher priority, and a given behavior expert within the hierarchy adjusts the control parameters of a behavior expert assigned a lower priority.

7. The system as claimed in claim 6, wherein a given behavior expert within the hierarchy receives observed data from one or more data providers and zero or more behavior experts assigned a lower priority.

8. The system as claimed in claim 5, wherein the assignment of priority is dynamic.

9. The system as claimed in claim 3, wherein the observed data includes one of the following: stock transactions, database transactions, and memory usage by an application.

10. The system as claimed in claim 7, wherein adaptive feedback control is initiated by any given behavior expert within the hierarchy, depending on the optimal scope of control within the infrastructure.

11. A system for adaptively controlling an eService management system, comprising:
   a plurality of behavior experts, hierarchically distributed throughout an infrastructure of the eService business, wherein each behavior expert monitors and controls a particular aspect of an infrastructure according to an objective function;
   a plurality of data providers that provide the behavior experts with observed data for a particular aspect of the infrastructure; and
   a dispatcher that relays information from the behavior experts to a global repository.

12. The system as claimed in claim 11, wherein each behavior expert comprises:
   adjustable control parameters; and
   a set of one or more objective functions pertaining to the aspect of the infrastructure monitored and controlled by the behavior expert.

13. The system as claimed in claim 12, wherein each behavior expert in the distribution is assigned a priority.

14. The system as claimed in claim 13, wherein the control parameters of a given behavior expert within the hierarchy are dynamically adjusted by a behavior expert assigned a higher priority, and a given behavior expert within the hierarchy adjusts the control parameters of a behavior expert assigned a lower priority.

15. The system as claimed in claim 14, wherein a given behavior expert within the hierarchy receives observed data from one or more data providers and zero or more behavior experts assigned a lower priority.

16. The system as claimed in claim 13, wherein the assignment of priority is dynamic.

17. The system as claimed in claim 11, wherein the observed data includes one of the following: stock transactions, database transactions, and memory usage by an application.

18. The system as claimed in claim 15, wherein adaptive feedback control is initiated by any given behavior expert within the hierarchy, depending on the optimal scope of control within the infrastructure.

19. The system as claimed in claim 11, wherein each behavior expert sends information directly to the dispatcher depending on the following:
   the discrepancy between the observed data received by the behavior expert and the objective function; and
   the severity of the discrepancy.

20. The system as claimed in claim 19, wherein the severity of the discrepancy is adjustable to moderate the flow of information from the behavior expert to the dispatcher.

* * * * *